(12) United States Patent
Wang et al.

(10) Patent No.: US 10,854,026 B2
(45) Date of Patent: Dec. 1, 2020

(54) SYSTEM AND METHOD FOR PREMISE MANAGEMENT

(71) Applicant: IGLOOHOME PTE. LTD., Singapore (SG)

(72) Inventors: Yue Wang, Singapore (SG); Khee Kien Ho, Singapore (SG); Anthony Wen Jie Chow, Singapore (SG); Sharon May Ling Goh, Singapore (SG)

(73) Assignee: IGLOOHOME PTE. LTD., Singapore (SG)

( * ) Notice: Subject to any disclaimer, the term of this patent is extended or adjusted under 35 U.S.C. 154(b) by 0 days.

(21) Appl. No.: 16/773,748

(22) Filed: Jan. 27, 2020

(65) Prior Publication Data

US 2020/0160638 A1    May 21, 2020

Related U.S. Application Data

(63) Continuation of application No. 15/571,826, filed as application No. PCT/SG2016/050214 on May 6, 2016, now Pat. No. 10,586,410.

(30) Foreign Application Priority Data

May 6, 2015    (SG) ........................... 10201503531V

(51) Int. Cl.
   *G07C 9/21*      (2020.01)
   *G06Q 10/02*    (2012.01)
   (Continued)

(52) U.S. Cl.
   CPC ........... *G07C 9/215* (2020.01); *G06F 1/3231* (2013.01); *G06F 1/3287* (2013.01); *G06Q 10/02* (2013.01);
   (Continued)

(58) Field of Classification Search
   CPC ........... G07C 9/00023; G07C 9/00103; G07C 9/00309; G07C 9/215; G07C 9/27; G06F 1/3231; G06F 1/3287; G06Q 10/02
   See application file for complete search history.

(56) References Cited

U.S. PATENT DOCUMENTS

| 2003/0149576 A1* | 8/2003 | Sunyich | G06Q 10/02 705/5 |
| 2003/0208386 A1* | 11/2003 | Brondrup | H04W 12/0013 705/5 |

(Continued)

OTHER PUBLICATIONS

Written Opinion and International Search Report of international application PCT/SG2016/050214; International Preliminary Report on Patentability of Application PCT/SG2016/050214.

*Primary Examiner* — Thomas D Alunkal
(74) *Attorney, Agent, or Firm* — Joseph G. Chu; Jeremy I. Maynard; JCIP

(57) ABSTRACT

Systems and methods for premise management comprising a reservation 5 management module having at least one server, the at least one server arranged in data communication with a user device to receive a request for reservation from the user device to access a premise for a specific duration; and a key generator arranged in data communication with the reservation management module; wherein upon receipt of the request for reservation, the key generator generates a secret key for 10 the user to access the premise for the specific duration, is disclosed. The system may be integrated with other modules including, but not limited to, a lock system and a presence detection system to provide a seamless service to a user.

17 Claims, 6 Drawing Sheets

(51) Int. Cl.
    *G06F 1/3231*     (2019.01)
    *G07C 9/20*     (2020.01)
    *G06Q 50/12*     (2012.01)
    *G07C 9/27*     (2020.01)
    *G06F 1/3287*     (2019.01)
    *G07C 9/00*     (2020.01)
    *H04L 9/08*     (2006.01)

(52) U.S. Cl.
    CPC ......... *G06Q 50/12* (2013.01); *G07C 9/00309* (2013.01); *G07C 9/27* (2020.01); *H04L 9/0866* (2013.01); *G07C 2009/00428* (2013.01); *G07C 2009/00769* (2013.01)

(56) References Cited

U.S. PATENT DOCUMENTS

| | | | |
|---|---|---|---|
| 2007/0090921 A1* | 4/2007 | Fisher | G07C 9/00309 340/5.73 |
| 2010/0085155 A1* | 4/2010 | Boss | H04Q 9/00 340/10.1 |
| 2011/0181412 A1* | 7/2011 | Alexander | G05B 19/042 340/541 |
| 2013/0024222 A1* | 1/2013 | Dunn | G07C 9/00904 705/5 |
| 2013/0088320 A1* | 4/2013 | Black | G06Q 50/12 340/5.6 |
| 2014/0222210 A1* | 8/2014 | Agarwal | G05B 15/02 700/275 |

* cited by examiner

Reservation Management And Lock System

Presence Detection System

Energy Conservation System

SYSTEM AND METHOD FOR PREMISE MANAGEMENT

CROSS REFERENCE TO RELATED APPLICATIONS

This application is a continuation of and claims the right of priority from U.S. patent application Ser. No. 15/571,826 having a filing date of Nov. 4, 2017, which claims the right of priority to PCT/SG2016/050214 having a filing date of May 6, 2016, which claims the right of priority to Singapore patent application 10201503531 V having a filing date of May 6, 2015. The entirety of the contents of these respective applications are hereby incorporated by reference.

TECHNICAL FIELD OF INVENTION

The invention relates to a system and method for premise management. The invention is suitable, but not limited to accommodation reservation and is described in such context.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Existing accommodation reservation systems, such web services provided by Airbnb™ or HomeAway™ provide online portals for users to post accommodation offers for lodgings that they own or occupy. In most cases, the users of the accommodation reservation systems are homeowners and not professional hoteliers. These accommodation reservation systems that match users looking for short term accommodation needs with other users seeking to rent their lodgings are often termed as short termed rental reservation systems.

The users who seek to rent out their accommodations are often termed as hosts. These short term rental hosts suffer from many pain points. Firstly, these hosts have to coordinate key exchanges with their guests who check in at different times of the day, even if the hosts are away or asleep. Secondly, many of the guests may not remember to turn off the home appliances, for example air conditioners, while they are away during their stay, resulting in substantial energy waste. Another problem is that the guest's preferences, for example that the guests prefers for the temperature of the room, are not brought across to different hotels he or she is staying in.

Current approaches require heavy investment in infrastructure and require installation in many rooms to achieve operational efficiency to achieve economies of scale. They are hence expensive and not suitable for short term rental hosts with the apartment or room to rent out. Present approaches adopted by the short term rental hosts to solving these pain points include key delivery services which is labour intensive and expensive; the cost for such services can be as high up to 10% of amount paid for reserving the accommodation. Hence there exists a need for the provision of affordable premise accommodation management system to short term rental hosts for alleviating one or more of the aforementioned problems.

SUMMARY OF INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Definitions: In the description, the term "premise" is a broad term which includes "house", "accommodation", shelters, office space, etc. The term is used generically to refer to any type of dwelling or building in which users inhabit for any length of time, including businesses or homes or hotel rooms or office space, meeting rooms, sport facilities etc.

In the description, the term "mobile terminal" refers to any radio or mobile device connected to a network (such as mobile phone (e.g., smart phone, feature phone), mobile wideband, computer, tablet, PDA (Personal Digital Assistant), Smart Watch, any type of fixed station or data terminal). The network can be either wireless or wired.

In the description, the term "mobile phone fingerprint" refers to the identification information that uniquely identifies a mobile phone. For example, a mobile phone fingerprint could include the identification of the operating system (OS) via a freedom textual description of the OS, and a classification which provides the vendor name, underlying OS, OS generation, and device type (general purpose, router, switch, game console, etc). Most fingerprints also have a Common Platform Enumeration (CPE) representation, like cpelo:linux:linux_kernel:2.6. Other examples include, but are not limited to, the use of phone including the Bluetooth and Ethernet Mac address and the hostname.

In the description, the term "electronic command" refers to a portion of programming code that is sent from a source to an apparatus, device or equipment over one or more communication channels, the "electronic command" operable to prompt an apparatus, device or equipment to execute a function. The "electronic command" can be a segment of code that contains steps that need to be executed by the apparatus, device or equipment that receive the segment of code. In this regard, the "electronic command" can also function as an electronic enabler or disabler.

The invention seeks to provide systems and methods for premise management not limited to hotels or accommodation for short term stay, although various embodiments may be described in such context.

The premise management system for improved controlled access to the accommodation, energy conservation and guest personalisation so that to have an affordable accommodation management system that integrates the guest reservations with the systems for issuance of secret keys of a lock system, and a presence system to detect the presence of guests to conserve energy, and for the guests to have personalised settings across their stay in different properties with the management system installed.

An advantage of the invention seeks to provide a property manager managing the accommodation a more efficient way of managing guest check ins and check outs, to reduce energy consumption when the guests are not around, and to improve the guest experience by providing personalised settings. The invention seeks to provide systems and methods for premise management not limited to hotels or accommodation for short term stay, although various embodiments may be described in such context.

The premise management system for improved controlled access to the accommodation, energy conservation and guest personalisation so that to have an affordable accommodation management system that integrates the guest reservations with the systems for issuance of secret keys of a lock system, and a presence system to detect the presence of guests to conserve energy, and for the guests to have personalised settings across their stay in different properties with the management system installed.

In accordance with an aspect of the invention, there is a system for premise management comprising: a reservation management module having at least one server, the at least one server arranged in data communication with a user device to receive a request for reservation from the user device to access a premise for a specific duration; and a key generator arranged in data communication with the reservation management module; wherein upon receipt of the request for reservation, the key generator generates a secret key for the user to access the premise for the specific duration. The present system mitigates the existing technical problem of coordinating key exchanges between the short term rental hosts and the guests. First of all, as short term rental guests might check in at different times of a day, even while the hosts are away or asleep, it is challenging to coordinate the key exchanges between the hosts and the guests. Although some try to manage the key exchanges by engaging key delivery services, it is still labour intensive for the delivery personnel and the associated costs are high. The present system does not require the physical delivery of the key as a secret key can be automatically generated by a key generator arranged to be in data communication with a premise reservation management module, and provided to the respective user. The present invention therefore alleviates the technical problems in coordinating the delivery of physical keys as well as reducing the costs and labours required for key delivery.

Preferably, the key generator is in data communication with a lock system arranged to receive the secret key. Arranging the key generator to be data communication with a lock system can provide further technical advantages as the lock system can directly and efficiently store the information about the secret key generated, and can accordingly grant the guest access to the premise when guest presents the secret key to the lock system.

Preferably, the lock system is arranged to receive an electronic command to enable the usage of the secret key from a first predetermined time before the specific duration. Applying an electronic command to enable the usage of the secret key from a first predetermined time before the specific duration can further improve the efficiency and security of the premise management system, as the secret key is enabled only at a predetermined time. This prevents the guests from entering into the premise earlier than scheduled.

Preferably, the lock system is arranged to receive an electronic command to disable the usage of the secret key at a second predetermined time after the specific duration. This can further improve the efficiency and security of the premise management system by, for example, preventing guests from overstaying at the premise (e.g., a guest might gain access to the premise after the reservation period if the secret key is not timely disabled).

Preferably, the lock system further comprises: a compartment for storing at least one pre-identified item; a controller arranged to receive the secret key from the key generator; a detection device comprising an identifier tag attached to the at least one item, the identifier tag arranged in data communication with the controller to determine a first status on whether the at least one pre-identified item is present or absent in the compartment and a second status on whether the at least one pre-identified item is associated with the compartment.

Preferably, the secret key is in the form of at least one of the following: personal identification number (PIN) code, biometric signature. Such identification information is particularly suited for generating a secret key of high security.

Preferably, the lock system comprises at least one lock controller device. A lock controller device is particularly suited for facilitating the secret key generator to enable or disable the secret key.

Preferably, the data communication between the key generator and the lock system is based on a wireless communication protocol. Having the key generator and the lock system in data communication via a wireless communication protocol is particularly suited for low-cost implementation of the present invention. For example, there is no need to setup cables and wires to connect the key generator and the lock system.

Preferably, the reservation management module is in data communication with a presence detection module. Having a presence detection module can, for example, further converse the energy expenses at the premise, as the presence detection module can instruct the reservation management module to turn off energy-consuming devices. Another example is that the presence detection module, when detecting that the guest has left the premise, can instruct the premise management to send the relevant service personnel to clean the premise while the guest is not around. Preferably, the system further comprises a service module operable to receive the specific duration and a status whether the user is within range of the premise, and thereafter to determine at least one goods or service to offer to the user. Comprising a service module can further improve the user/guest experience at the premise, and improve the overall efficiency and effectiveness of the premise management system.

Preferably, the presence detection module is arranged in data communication with a plurality of sensors to detect whether a user is within range of the premise. Having a plurality of sensors can further enhance the accuracy of the presence detection module in determining the presence of the guest, and reduces the errors in detecting the presence of guest at the premise.

Preferably, the plurality of sensors include at least two of the following: a motion sensor positioned within the premise; a network inspector to detect network access or usage by the user; a location sensor operable to detect and interact with the user device to determine the location of the user. The motion sensor is particularly suited for detecting the motions (of users) at the premise. The network inspector is particularly suited for detecting the network access or usage of the users. A location sensor is particularly suited for detecting the location of the users at the premises. These specialized sensors can generate useful information about the users, and improve the accuracy of the presence detection system in determining the presence of users.

Preferably, the location sensor includes a Bluetooth beacon. A Bluetooth beacon is particularly suited for accurately and conveniently detecting the location of the users.

Preferably, the presence detection module is arranged in data communication with the lock system. Having the presence detection module and the lock system in data communication can further improve the accuracy of the presence detection module since the lock system can provide useful information/data for determining the presence of users at the premise.

Preferably, the presence detection module is arranged with a probabilistic engine to determine the probability of whether a user is present in the premise. A probabilistic engine takes various types of factors, data and information into consideration when calculating the probability of the presence of user. Thus, the probabilistic engine can improve the overall accuracy of the presence detection system in determining the presence of the user.

Preferably, the probabilistic engine is configured to allocate weights associated with each of the plurality of sensors and the lock system. Allocating weights associated with each of the plurality of sensors and the lock system can further improve the accuracy of the presence detection system, as the information/data from different sensors and the lock system carry different values in determining the presence of user—allocating different weights to different information/data can further reduce the chance of false positive and false negative presence detections.

Preferably, the presence detection module is arranged in data communication with an energy conservation module. The presence detection module can instruct the energy conservation module to operate depending on the presence/absence of users at the premise, and therefore improve the efficiency of energy usage at the premise.

Preferably, the energy conservation module is arranged in data communication with a plurality of energy controllers installed at a plurality of locations within the premise, wherein each of the energy controller is associates with at least one apparatus. This arrangement enables the energy conservation module to control a plurality of energy controllers installed at a plurality of locations with the premise, and accordingly further conserve the energy usage at the premise.

Preferably, the power controllers include at least two of the following: a thermostat controller, a light intensity controller, and an air conditioner controller. These energy controllers are particularly suited for controlling the main energy consuming devices at the premise, and accordingly can further converse the energy usage at the premise. Preferably, the energy conservation module is configured to send a command to the plurality of energy controllers to reduce the energy consumption or switch off the at least one apparatus associated with the plurality of energy controller. This arrangement can further converse the energy usage at the premise.

Preferably, the energy conservation module is configured to reduce the energy consumption or switch off the at least one apparatus associated with the plurality of energy controller when a user is determined to be absent from the premise in the day. This arrangement makes sure that the energy-consuming apparatuses are not in operation while the user is absent from the premise in the day, and accordingly further improves the efficiency of energy usage at the premise.

Preferably, the energy conservation module is configured to maintain the energy consumption of the at least one apparatus associated with the plurality of energy controller when a user is determined to be absent from the premise in the night. This arrangement makes sure that the energy-consuming apparatuses are not in operation while the user is absent from the premise in the night, and accordingly further improves the efficiency of energy usage at the premise.

Preferably, the presence detection module is arranged in data communication with a user preference engine, the user preference engine configured to collect user preference settings from a plurality of environmental sensors associated with an ambient or environmental variable of the premise. Incorporating the user preference engine can facilitate the premise management system to provide services and products that can cater to the specific needs of a particular user. This could improve the overall user experience at the premise.

Preferably, the plurality of environmental sensors include a temperature sensor, a light intensity sensor, a humidity sensor, a sound level sensor or any two of the same. These environmental sensors are particularly suited for collecting environmental information/data important to users. These sensors can therefore effectively improve the user experiences.

Preferably, the user device is a mobile device associated with an identifier of the user. A mobile device is particularly suited for submitting the user request (e.g., for reservation) to the reservation management system, as well as for identifying the presence and identity of the user.

Preferably, the presence detection module is arranged in data communication with a safety and security module. Arranging the presence detection module in data communication with a safety and security module can improve the overall safety of the premise and accordingly improve the user experience at the premise.

Preferably, the safety and security module is arranged to receive input from a plurality of safety or security sensors, the plurality of safety or security sensors positioned at various locations of the premise. Having a plurality of safety or security sensors can further enhance the security of the premise and accordingly improve the user experience at the premise.

Preferably, the plurality of safety and security sensors include a water hazard sensor and an access sensor. Water hazard sensor is particularly suited for detecting water hazards such as the leakages of water pipes. The access sensor is particularly suited for detecting unauthorized access into the premise. These sensors can further enhance the security of the premise and accordingly improve the user experience at the premise.

Preferably, the user device is a mobile device equipped with at least one wireless communications means. A mobile device with at least one wireless communications means is particularly suited for submitting the user request (e.g., for reservation) to the reservation management system, as well as for identifying the presence and identity of the user.

Preferably, the key generator is in built within the key controller device and the user device. Having the key generator built within the key controller device and the user device allows the generation of pin codes and synchronization without placing reliance on the internet. This is particular useful for premises with poor internet connectivity or users whose devices are not connected to internet.

Preferably, the system further comprises a notification center operable to send notifications related to the reservation to the user device or at least one premise manager. Having a notification center further improves the communication between the users (guests) and the premise manager, and enables to premise manager to remotely manage the premise in an efficient and effective manner.

Preferably, the system comprises a log database operable to store records of events. The log database captures and stores the events, the information/data of which can be applied to further enhance the premise management system.

In accordance with another aspect of the invention, there is provided a method for managing a premise comprising the steps of: receiving from a user device a request for reservation to access a premise for a specific duration; verifying the request for reservation; wherein upon verification generating by a key generator a secret key; wherein the secret key permits the user to access the premise for the specific duration. The present method could mitigate the existing technical problem of coordinating key exchanges between the short term rental hosts and the guests. First of all, as short term rental guests might check in at different times of a day, even while the hosts are away or asleep, it is challenging to coordinate the key exchanges between the hosts and the guests. Although some try to manage the key exchanges by engaging key delivery services, it is still labour intensive for the delivery personnel and the associated costs are high. The present system does not require the physical delivery of the key as a secret key can be automatically generated by a key generator arranged to be in data communication with a premise reservation management module, and provided to the respective user. The present invention therefore alleviates the technical problems in coordinating the delivery of physical keys as well as reducing the costs and labours required for key delivery.

Preferably, the method further comprises the step of sending the secret key to a lock system. Sending the secret key to a lock system can provide further technical advantages as the lock system can directly and efficiently store the information about the secret key generated, and can accordingly grant the guest access to the premise when guest presents the secret key to the lock system.

Preferably, the lock system is arranged to receive an electronic command to enable the usage of the secret key from a first predetermined time before the specific duration. Applying an electronic command to enable the usage of the secret key from a first predetermined time before the specific duration can further improve the efficiency and security of the premise management system, as the secret key is enabled only at a predetermined time. This prevents the guests from entering into the premise earlier than scheduled.

Preferably, the lock system is arranged to receive an electronic command to disable the usage of the secret key at a second predetermined time after the specific duration. This can further improve the efficiency and security of the premise management system by, for example, preventing guests from overstaying at the premise (e.g., a guest might gain access to the premise after the reservation period if the secret key is not timely disabled).

Preferably, the secret key is in the form of at least one of the following: personal identification number (PIN) code, biometric signature, barcode, or QR code. The identification information is particularly suited for particularly suited for generating the secret key.

Preferably, the lock system comprises at least one lock controller device. A lock controller device is particularly suited for facilitating the secret key generator to enable or disable the secret key.

Preferably, the step of sending the secret key to the lock system is based on a wireless communication protocol. Utilizing a wireless communication for sending the secret key to the lock system enables low-cost implementation of the present invention. For example, there is no need to setup cables and wires to connect the key generator and the lock system.

Preferably, the method further comprises the step of detecting by a presence detection module whether the user is within range of the premise. Comprising a further step of using the presence detection module to detect the presence of the user within the range of the premise can further improve the user/guest experience at the premise, and improve the overall efficiency and effectiveness of the premise management system.

Preferably, the presence detection module is arranged in data communication with a plurality of sensors to detect whether a user is within range of the premise. Having a plurality of sensors can further enhance the accuracy of the presence detection module in determining the presence of the guest, and reduces the errors in detecting the presence of guest at the premise.

Preferably, the plurality of sensors include at least two of the following: a motion sensor positioned within the premise; a network inspector to detect network access or usage by the user; a location sensor operable to detect and interact with the user device to determine the location of the user. The motion sensor is particularly suited for detecting the motions (of users) at the premise. The network inspector is particularly suited for detecting the network access or usage of the users. A location sensor is particularly suited for detecting the location of the users at the premises. These specialized sensors can generate useful information about the users, and improve the accuracy of the presence detection system in determining the presence of users.

Preferably, the location sensor includes a Bluetooth beacon. A Bluetooth beacon is particularly suited for accurately and conveniently detecting the location of the users.

Preferably, the presence detection module is arranged in data communication with the lock system. Having the presence detection module and the lock system in data communication can further improve the accuracy of the presence detection module since the lock system can provide useful information/data for determining the presence of users at the premise, such as the opening of the door from outside, the opening of the door from inside, the opening of the door using a secret key generated by the premise management system.

Preferably, the presence detection module is arranged with a probabilistic engine to determine the probability of whether a user is present in the premise. A probabilistic engine takes various types of factors, data and information into consideration when calculating the probability of the presence of user. Thus, the probabilistic engine can improve the overall accuracy of the presence detection system in determining the presence of the user.

Preferably, the probabilistic engine is configured to allocate weights associated with each of the plurality of sensors and the lock system. Allocating weights associated with each of the plurality of sensors and the lock system can further improve the accuracy of the presence detection system, as the information/data from different sensors and the lock system carry different values in determining the presence of user—allocating different weights to different information/data can further reduce the chance of false positive and false negative presence detections.

Preferably, the presence detection module is arranged in data communication with an energy conservation module. The presence detection module can instruct the energy conservation module to operate depending on the presence/absence of users at the premise, and therefore improve the efficiency of energy usage at the premise.

Preferably, the energy conservation module is arranged in data communication with a plurality of energy controllers installed at a plurality of locations within the premise, wherein each of the energy controller is associates with at least one apparatus. This arrangement enables the energy conservation module to control a plurality of energy controllers installed at a plurality of locations with the premise, and accordingly further conserve the energy usage at the premise.

Preferably, the power controllers include at least two of the following: a thermostat controller, a light intensity controller, and an air conditioner controller. These energy controllers are particularly suited for controlling the main energy consuming devices at the premise, and accordingly can further converse the energy usage at the premise.

Preferably, the energy conservation module is configured to send a command to the plurality of energy controllers to reduce the energy consumption or switch off the at least one apparatus associated with the plurality of energy controller. This arrangement can further converse the energy usage at the premise.

Preferably, the energy conservation module is configured to reduce the energy consumption or switch off the at least one apparatus associated with the plurality of energy controller when a user is determined to be absent from the premise in the day. This arrangement makes sure that the energy-consuming apparatuses are not in operation while the user is absent from the premise in the day, and accordingly further improves the efficiency of energy usage at the premise.

Preferably, the energy conservation module is configured to maintain the energy consumption of the at least one apparatus associated with the plurality of energy controller when a user is determined to be absent from the premise in the night. This arrangement makes sure that the energy-consuming apparatuses are not in operation while the user is absent from the premise in the night, and accordingly further improves the efficiency of energy usage at the premise.

Preferably, the presence detection module is arranged in data communication with a user preference engine, the user preference engine configured to collect user preference settings from a plurality of environmental sensors associated with an ambient or environmental variable of the premise. Incorporating the user preference engine can facilitate the premise management system to provide services and products that can cater to the specific needs of a particular user. This could improve the overall user experience at the premise.

Preferably, the plurality of environmental sensors include a temperature sensor, a light intensity sensor, a humidity sensor, a sound level sensor or any two of the same. These environmental sensors are particularly suited for collecting environmental information/data that are most important and relevant to the users. These sensors can therefore effectively improve the user experiences.

Preferably, the user device is a mobile device associated with an identifier of the user. A mobile device is particularly suited for submitting the user request (e.g., for reservation) to the reservation management system, as well as for identifying the presence and identity of the user.

Preferably, the presence detection module is arranged in data communication with a safety and security module. Arranging the presence detection module in data communication with a safety and security module can improve the overall safety of the premise and accordingly improve the user experience at the premise.

Preferably, the safety and security module is arranged to receive input from a plurality of safety or security sensors, the plurality of safety or security sensors positioned at various locations of the premise. Having a plurality of safety or security sensors can further enhance the security of the premise and accordingly improve the user experience at the premise.

Preferably, the plurality of safety and security sensors include a water hazard sensor and an access sensor. Water hazard sensor is particularly suited for detecting water hazards such as the leakages of water pipes. The access sensor is particularly suited for detecting unauthorized access into the premise. These sensors can further enhance the security of the premise and accordingly improve the user experience at the premise.

Preferably, the user device is a mobile device equipped with at least one wireless communications means. A mobile device with at least one wireless communications means is particularly suited for submitting the user request (e.g., for reservation) to the reservation management system, as well as for identifying the presence and identity of the user.

Preferably, the key generator is in built within the key controller device and the user device. Having the key generator built within the key controller device and the user device allows the generation of pin codes and synchronization without placing reliance on the internet. This is particular useful for premises with poor internet connectivity or users whose devices are not connected to internet.

Preferably, the method further comprises a notification center operable to send notifications related to the reservation to the user device or at least one premise manager. Having a notification center further improves the communication between the users (guests) and the premise manager, and enables to premise manager to remotely manage the premise in an efficient and effective manner.

Preferably, the method further comprises a log database operable to store records of events. The log database captures and stores the events, the information/data of which can be applied to further enhance the premise management system.

In accordance with another aspect of the invention, there is provided a non-transitory computer readable medium that stores a computer program to be executed by a mobile device to perform a method of reserving and gaining access to a premise, the mobile device equipped with at least one wireless communications means, comprising the steps of: sending a reservation request to a reservation management module, the reservation request comprising a specific duration to access the premise; receiving a secret key; providing the secret key at a lock controller located at the premise; the secret key valid for the specific duration and upon gaining access to the premise, sending the location of the mobile device to a presence detection module.

The present non-transitory computer readable medium mitigates the existing technical problem of coordinating key exchanges between the short term rental hosts and the guests. First of all, as short term rental guests might check in at different times of a day, even while the hosts are away or asleep, it is challenging to coordinate the key exchanges between the hosts and the guests. Although some try to manage the key exchanges by engaging key delivery services, it is still labour intensive for the delivery personnel and the associated costs are high. The present invention does not require the physical delivery of the key as a secret key can be automatically generated by a key generator arranged to be in data communication with a premise reservation management module, and provided to the respective user conveniently via a mobile device. The present invention therefore alleviates the technical problems in coordinating the delivery of physical keys as well as reducing the costs and labours required for key delivery. Further, as the secret key is only valid for a specific duration, the present invention can prevent early check-in and over-stay at the premise, and accordingly improve the overall efficiency of the premise management. In accordance with another aspect of the invention, there is provided a method for managing a premise comprising the steps of: receiving from a reservation module a request for reservation to access a premise for a specific duration; verifying the request for reservation; wherein upon verification, generating by a key generator a secret key; wherein the secret key permits the user to access the premise for the specific duration. The present method mitigates the existing technical problem of coordinating key exchanges between the short term rental hosts and the guests. First of all, as short term rental guests might check in at different times of a day, even while the hosts are away or asleep, it is challenging to coordinate the key exchanges between the hosts and the guests. Although some try to manage the key exchanges by engaging key delivery services, it is still labour intensive for the delivery personnel and the associated costs are high. The present invention does not require the physical delivery of the key as a secret key can be automatically generated by a key generator arranged to be in data communication with a premise reservation management module, and provided to the respective user conveniently via a mobile device. The present invention therefore alleviates the technical problems in coordinating the delivery of physical keys as well as reducing the costs and labours required for key delivery. Further, as the secret key is only valid for a specific duration, the present invention can prevent early check-in and over-stay at the premise, and accordingly improve the overall efficiency of the premise management.

BRIEF DESCRIPTION OF DRAWING

The present invention will now be described, by way of example only, with reference to the accompanying drawings, in which.

Other arrangements of the invention are possible and, consequently, the accompanying drawing is not to be understood as superseding the generality of the preceding description of the invention.

PREFERRED EMBODIMENTS OF THE INVENTION

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise. In accordance with an aspect of the invention there is a system 100 for premise management comprising a reservation management module 102 having at least one server, the at least one server arranged in data communication with a user device (not shown) to receive a request for reservation from the user device to access a premise for a specific duration; and a key generator arranged in data communication with the reservation management module; wherein upon receipt of the request for reservation, the key generator generates a secret key for the user to access the premise for the specific duration.

Figure 1:
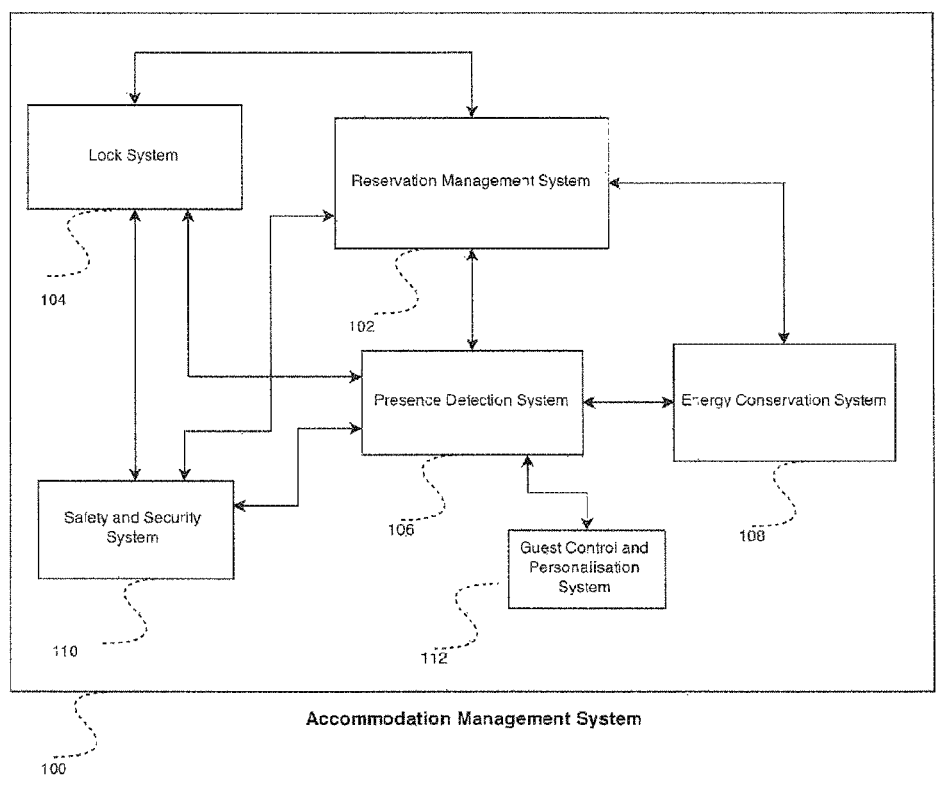
FIG. 1 is a simplified block diagram of an example of a system for an accommodation management system with an reservation management system, lock system, presence detection system, energy conservation system and safety and security system according to the invention.

Referring to the embodiment illustrated in FIG. 1, the premise management system 100 may be applied to a short-term accommodation such as hotels or student rental accommodation. The accommodation management system 100 may be integrated with existing accommodation reservations systems or other means of automated import or manual entry of for example, electronic requests for reservation to facilitate the input of guest reservations into the reservation management module 102. The accommodation 10 management system 100 may be integrated with the key generator or in data communication with the key generator to generate a secret key for a lock system 104, so as to facilitate the guest to enter premises of the accommodation that was reserved. Such data communication may be based on a wired or wireless communication protocol such as a TCP/IP, Wi-Fi, etc.

The usage of the secret key which is valid for the specific duration may be enabled from a first predetermined time before the specific duration, e.g. a few minutes just before the reservation check-in time. The usage of the secret key may be disabled at a second predetermined time after the specific duration, e.g. after the check-out time. The secret key may be in the form of at least one of the following: personal identification number (PIN) code, biometric signature.

In some embodiments, the accommodation management system comprises a presence detection system 106 to determine whether a guest is present within a range of the accommodation. Information from the lock system 104 (e.g. whether secret key is enabled) and the presence detection system 106 (whether the guest is present or not), may be used to determine whether a guest is present at the accommodation. The information may be combined in various ways, such as the use of weights for different types of data for varying degree of importance.

In some embodiments, the presence detection module or system 106 may be arranged in data communication with an energy conservation system 108 for decision making to control or switch off electrical appliances to conserve energy.

In some embodiments, the presence detection module or system 106 may be arranged in data communication with a user preference engine, for example a guest control and personalization system 112 which may be arranged to receive and use data from the presence detection system, a plurality of data vector of environmental and ambience data collected, and guest preference data to personalise the guest experience, for example temperature, humidity, light intensity or other environment variables, whenever the guest stays in an accommodation with the management system installed in it. The accommodation management system may further comprise a safety and security system 110, which an authorized personnel of the accommodation, such as property managers may use to manage safety and security issues, for example smoke hazards or water hazards. The various arrangements are further elaborated or described with reference to FIG. 2 to FIG. 6.

Figure 2:
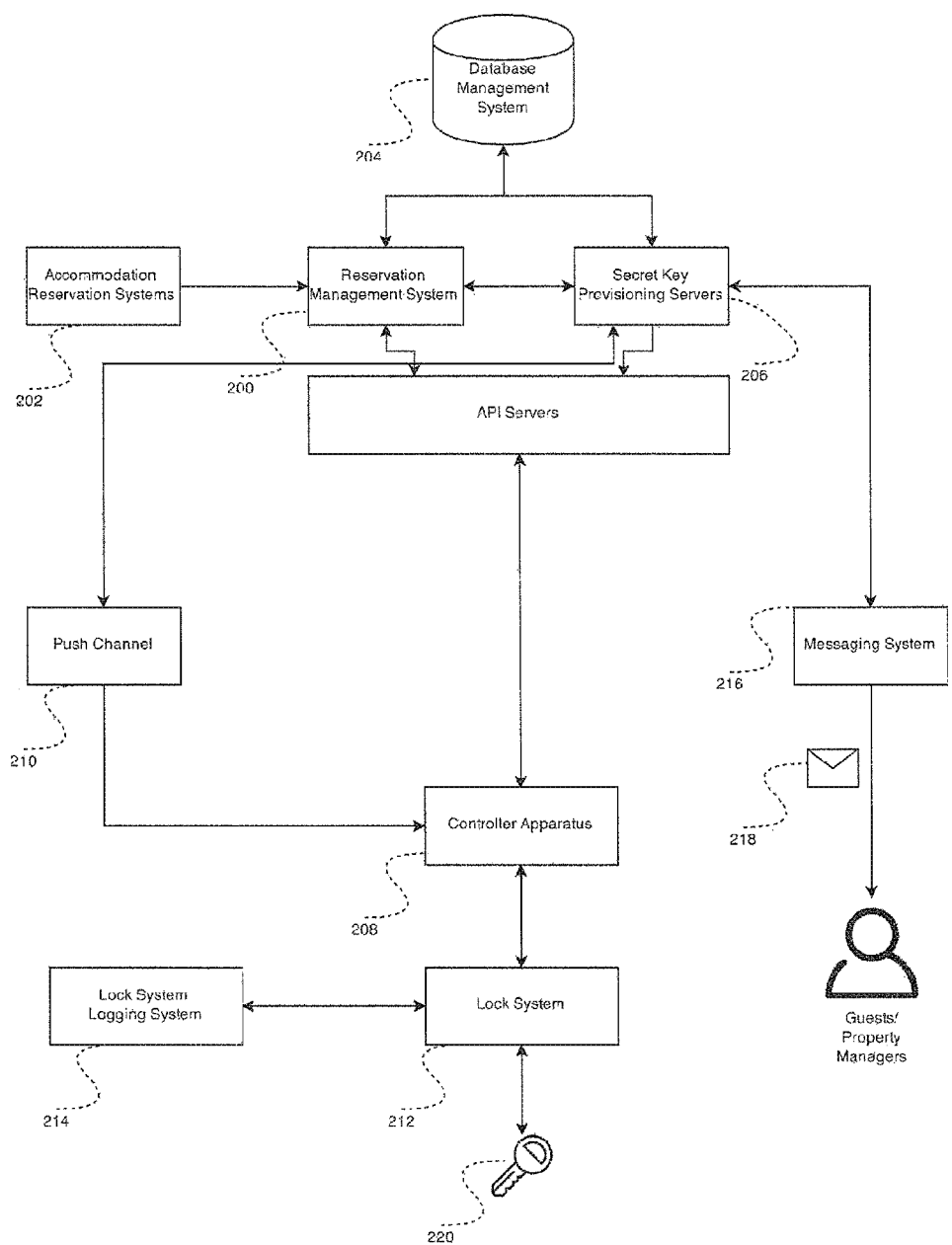
FIG. 2. shows a simplified block diagram of an embodiment of the accommodation management system, reservation management system and lock system according to an aspect of the inventive subject matter.

FIG. 2 is a block diagram illustrating the reservation management system and lock system. In some embodiments, the reservation management module or reservation management system 200 comprises at least one server, and in particular, a plurality of servers or IT systems that receive and store guest reservations in a database management system 204 comprising one or more databases in a distributed environment or otherwise. The requests for reservation by different guests may be via manual input to one or more physical forms, or by communicating to other accommodation reservation systems 202 or other forms of automated import including communicating via application programming interfaces provided by the other accommodation reservation systems, or by importing suitable calendar data containing the guest reservations provided by any accommodation reservation system. The reservation management module should preferably cooperate and communicate with a variety of accommodation reservation systems in the market. This is because guests can make reservations across a wide spectrum of these reservation systems, and hence it is an advantage to integrate with as many of the reservation systems as possible.

Integrating the system of the invention with the other reservation system(s) is dependent on the configurations and settings of the specific reservation system(s). In general, this integration can be achieved through, but not limited to, some form of API (Application Program Interface) integration or pulling data via some URL (Uniform Resource Locator).

In some embodiments, information required for a user to make a reservation of a premise might include: name of guest, the starting date and ending dates of the reservation, the premise booked. In some embodiments, the information required for reserving a premise might further include the reservation ID and other guest details (e.g., user ID number, passport number, age/date of birth, gender, purpose of stay).

Once the reservations have been stored, the key generator, which may be in the form of secret key provisioning servers 206 will now have the information to provision for access control for the check-in, check-out, entry or exit into the accommodation. The secret key provisioning server 206 generate a secret key 220 for a lock system 212 for the reservation and stores in on the database management system 204. The secret key 220 may take many forms, for example pin code number, encrypted keys or biometric signatures, such secret keys comprising a certain length of letters, numbers and/or symbols depending on the lock system 212. The secret key will be configured to be enabled at a fixed time before the reservation check-in time and will be disabled after the check-out time, and the user of the system 200 such as a guest or property manager may be informed via messages 218 sent through a messaging system 216. The messages 218 may be in the form of SMS, email, mobile push notifications or other modes of communication to the guest or property manager.

When lock system 212 receives the secret key 220 from the guest, the guest will then be able to gain access to enter the accommodation that he or she reserved. The secret key may be presented to the lock system by means of the mobile terminal communicating with the lock controller device via a wireless communication protocol such as Bluetooth, Infrared, near field communication (NFC).

To enable or disable the secret key, the secret key provisioning server 206 may send the command, which may be in the form of an electronic command, through a push channel 210 to a lock controller apparatus or device 208. The push channel may be implemented by suitable means, for example by client long polling, Websocket, server-side events, socket servers or other server push technologies.

The lock controller device 208 receives events and commands from the push channel 210 and communicates instructions to provision or remove the secret keys to the lock system 212. This communication to the lock system may be facilitated by wireless communication protocols such as Bluetooth, radio frequency channels like z-wave or ZigBee protocols, or other suitable means of communication protocols.

The records of the lock system may be stored on a lock system logging system 214 or sent to a database management system 204. These records may contain information on when the lock system has been open, from which side of the door has been opened, and for how long the lock system has remained opened or any other lock system information. The information stored on the lock system logging system 214 may be used in other parts of the invention, for example the presence detection system.

Figure 3:
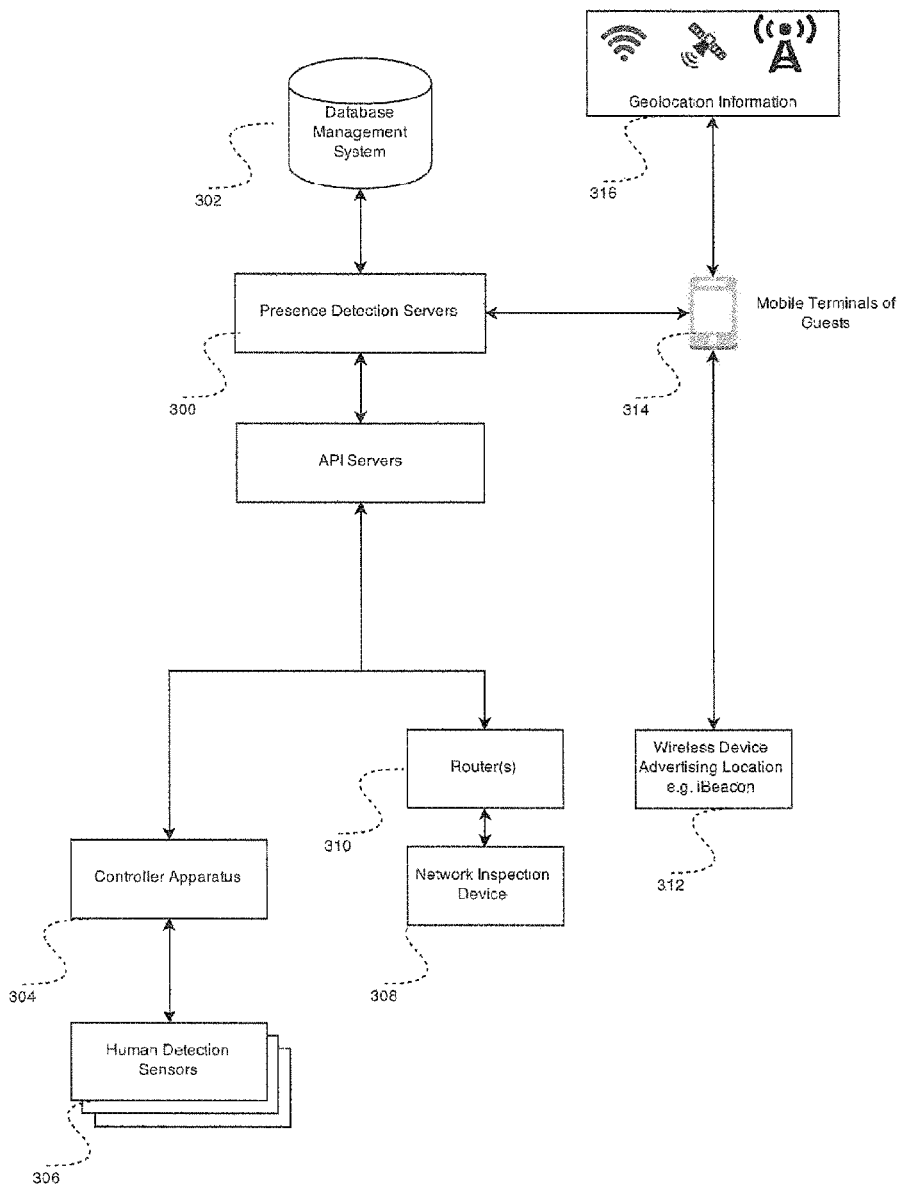
FIG. 3 shows a simplified block diagram of an embodiment of the presence detection system according to an aspect of the inventive subject matter.

FIG. 3 is a block diagram illustrating the presence detection system 106 arranged in data communication with a plurality of sensors to detect whether a user is within range of the premises. The plurality of sensors may include the following: a motion sensor positioned within the premise; a network inspector to detect network access or usage by the user; a location sensor operable to detect and interact with the user device to determine the location of the user.

In some embodiments, the presence detection servers 300 receive a plurality of data in the form of a vector of data including readings from a plurality of human detection sensors 306 installed at various locations within the room, on the accommodation, data from network inspection device 308 and routers 310 installed in the internet network of the accommodation, guest location data 316 or wireless device advertising location data 312. Devices capable of detecting the location of the wireless device (also known as "beacon") 312, such as a Bluetooth beacon and a WiFi access point, can provide data on the location of the wireless device to the presence detection servers 300. For example, a WiFi access point is capable of detecting the wireless Mac address of the Mac devices. The wireless Mac address can serve as a proxy data for user presence at the premise.

The data are stored on a database management system 302. The presence detection servers 300 use these data to form a probabilistic model of whether a guest is present at the accommodation (via weighted rule based expert system, machine based learning such as neural network etc). This model may be trained and refined from the historic data that the system has amassed via machine learning techniques. The probabilistic model may be implemented in the form of an engine having algorithms installed on one or more servers.

The controller apparatus 304 captures readings from the human detection sensors 306, for example motion sensors or passive infrared sensors, installed on the accommodation at regular intervals. The controller apparatus 304 subsequently sends the readings to the presence detection servers 300 through an API server for storage on the database management system 302.

One of the common guest behaviours after they check-in to the accommodation is to connect their mobile device or terminals to the internet network of the accommodation. The presence of a guest's mobile terminal 314 (or any wireless device) is an (indication) to whether a guest is present at the accommodation. A guest's mobile terminal 314 may be detected by a network inspection device 308 and router 310 installed in the internet network of the accommodation. The network inspection device 308 performs port scanning or deep packet inspection of the network packets in the internet network to scan for the presence of mobile terminals to detecting a mobile phone's signature fingerprint. The mobile terminal's fingerprint will differ according to the mobile terminal's operating system. The network inspection device 308 may also detect and store the number of devices connected to the internet network. The network inspection device 308 may also detect the presence of mobile terminals by performing, at regular intervals, a reverse domain name server (DNS) lookup from the router 310, to match private IP addresses to DHCP hostnames to detect certain mobile operating systems, for example the Android mobile operating system may register DHCP names starting with "Android™" with the router.

The guest may install a dedicated software application (in the form of a mobile application or 'app') on the mobile terminal 314. The mobile application may be able to reveal the location of the mobile terminal, by means of Global Positioning System, Wi-Fi positioning or cell tower position or other geolocation technology 316. The location of the mobile terminal will reveal whether it is in near proximity of the accommodation and hence act as a proxy/indication as to whether the guest is within range or present. The application may send the location of the mobile terminal at regular intervals or when the location changes significantly to the presence detection servers 300 for storage in the database management system 302.

A Bluetooth beacon 312, for example iBeacon, may be placed within the accommodation. An application installed on the mobile terminal 314 may scan, preferably in the background, to see if the mobile terminal is near the Bluetooth™ beacon. If the mobile terminal 314 is within close proximity of the Bluetooth™ beacon 312, the mobile terminal is present in the accommodation. The mobile terminal sends the proximity data to the iBeacon™ registered at the accommodation to the presence detection servers 300 for storage in the database management system 302.

The presence detection servers 300 may compute a probabilistic model, based on the vector of readings and data as disclosed above, to calculate the probability of whether a guest is present at the accommodation. If human presence, for example motion, is detected for a prolonged period, it is highly probable that a guest is within range of the accommodation or present. However, there will be situations where the guest is within range but the motion sensors will fail to pick up readings beyond the specified threshold, for example when the guest is asleep; in this case the presence detection system will rely on the other inputs from the other components to form the probabilistic model. If any mobile terminal 314 is detected, it increases the probability that a guest is at the accommodation. If the number of devices detected are larger than the baseline number of devices detected when there are no guest reservations, a guest device or mobile terminal may be present at the accommodation, and this input is used to form part of the probabilistic model.

The presence detection module may be arranged in data communication with an energy conservation module. The energy conservation module may be arranged in data communication with a plurality of energy controllers installed at a plurality of locations within the premise, wherein each of the energy controller is associated with at least one apparatus.

Figure 4:
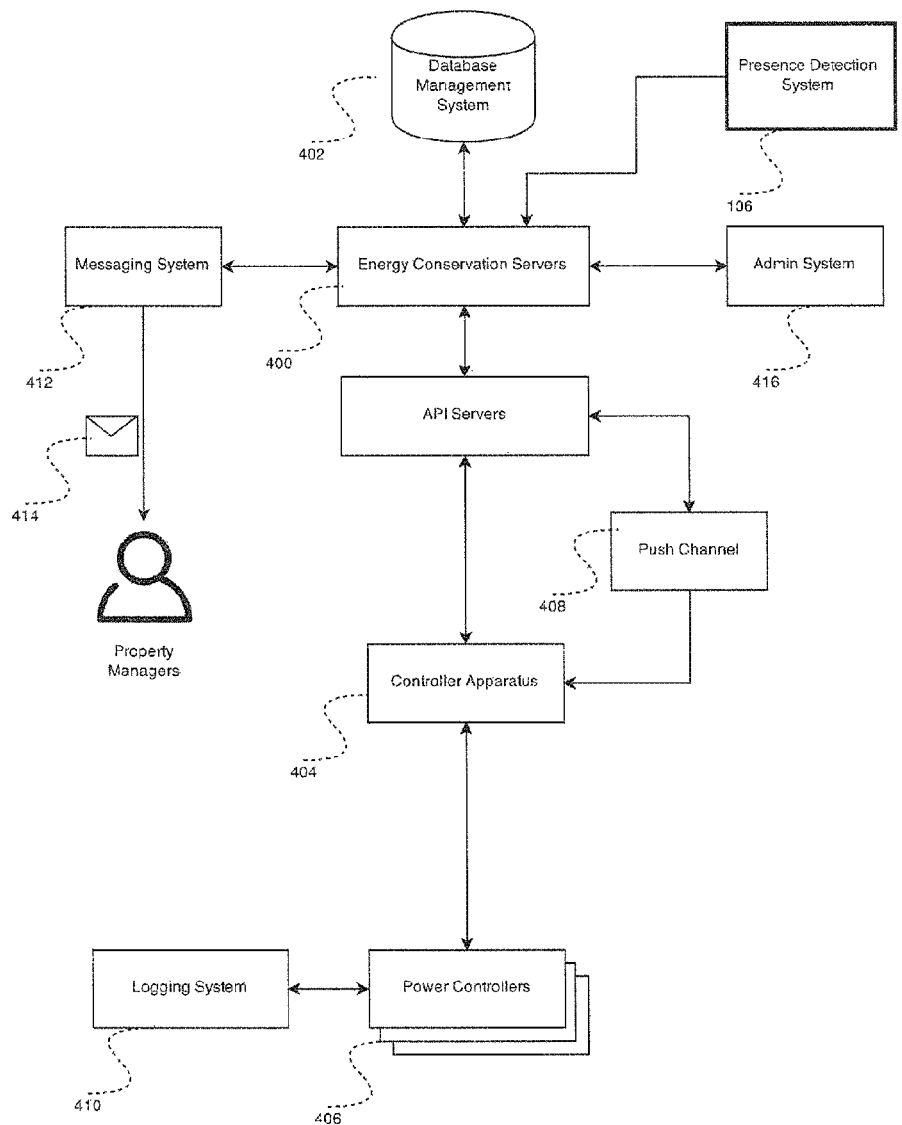
FIG. 4. shows a simplified block diagram of an embodiment of the energy conservation system according to an aspect of the inventive subject matter.

FIG. 4 is a block diagram illustrating the energy conservation system or module 108 arranged in data communication with the presence detection module. In this embodiment, the energy conservation system in the form of servers 400 receive input from the presence detection system 106. Based on this presence data, or preset rules, the energy conservation server or servers will determine whether the system should conserve energy. An example of a preset rule may be to "conserve energy if no guests has been detected at the premises for 20 minutes in the daytime (e.g. 9a.m. to 9p.m.), but leave the power on at night (9p.m to 9a.m)". The definition of daytime or night is arbitrary and not to be construed as limiting. When the energy conservation servers 400 determine that the energy conservation mode is to be triggered, instructions are sent through a push channel 408 to a controller apparatus 404, which may be a mobile device installed with suitable software to perform the functions of a controller apparatus 404 as known to a skilled person. The controller apparatus 404 then communicates the instructions to a particular power controller 406 or an array of power controllers to switch off or reduce the power consumption by any means of suitable data communication, for example Bluetooth, z-wave or ZigBee protocols. The power controllers may include thermostat controllers, light intensity controllers, air conditioner controllers or other controllers that may control the power usage.

The property manager may be informed via electronic messages 414 sent through the messaging system 412 that energy conservation has taken place. The messages 414, may be in the form of short message system (SMS), email, mobile push notifications or other modes of communication to the guest and/or property manager.

A property manager may use an administrative system 416 to view the current energy conservation settings for his accommodation, and to override settings by the energy conservation system turn on or turn off a selective power controller or all the power controllers in the accommodation. A property manager may also receive energy conservation reports from the administrative system 416.

The records of the events of energy conservation may be stored on a logging system 410 or sent to a database management system 402. These records may contain information on when the energy conservation has taken place, or if energy conservation decisions has been replaced with instructions by the property manager or his administrator. A property manager may receive reports from these records on the administrative system 416.

In some embodiments the presence detection module 106 is arranged in data communication with a user preference engine, the user preference engine configured to collect user preference settings from a plurality of environmental sensors associated with an ambient or environmental variable of the premise.

Figure 5:
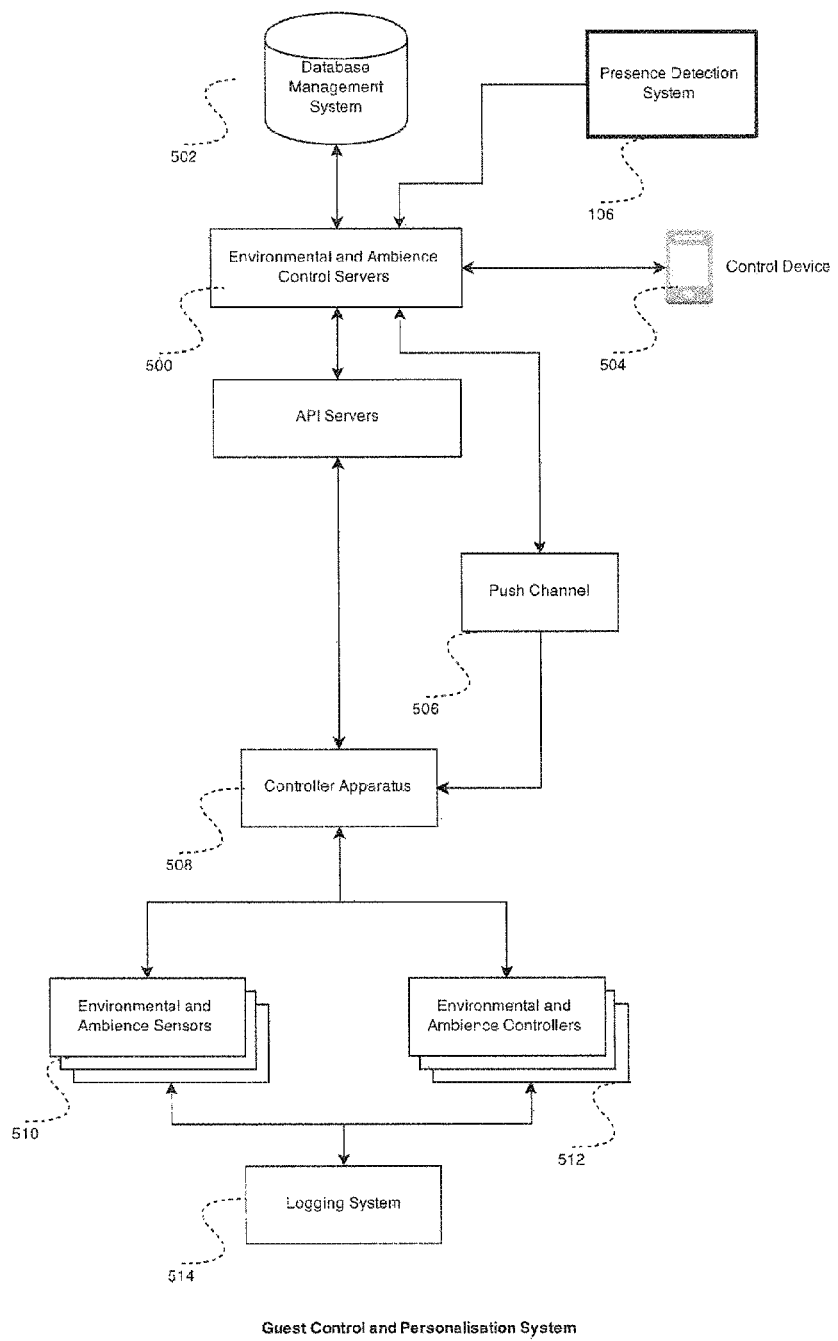
FIG. 5. shows a simplified block diagram of an embodiment of the guest control and personalization system according to an aspect of the inventive subject matter.

FIG. 5 is a block diagram illustrating the user preference engine as a guest control and personalization server 112. In this embodiment, the environmental and ambience control servers 500 receive input from the presence detection module or system 106. A guest may use a control device 504 to control environmental or ambience settings, for example temperature, humidity or brightness, at the accommodation. The control device may be mobile device having a software application installed on the same. The desired settings may be sent to one or more environmental and ambience control servers 500 or to a database management system 502 for storage. The instructions to change the environmental or ambience settings are then sent through a push channel 506 to a controller apparatus 508. The controller apparatus 508, in turn, may communicate instructions to an array of environmental controller or ambience controllers to change the environment or ambience settings, via suitable means of communication for example bluetooth, z-wave or Zigbee protocols.

An array of environmental sensors or ambience sensors 510 may be installed at the accommodation, for example temperature sensors, light intensity sensors, humidity sensors or sound level sensors. The controller apparatus 508 may read at regular intervals the readings from the environmental or ambience sensors 510 and send them to the servers 500 via an API server for storage on the database management system 502.

The environment and ambience control servers 500 may use a plurality of the guest preference data collected to form a data vector, together with a data vector of readings from the environmental and ambience sensors in the database management system to compute the environment or ambience preferences of the user.

Figure 6:
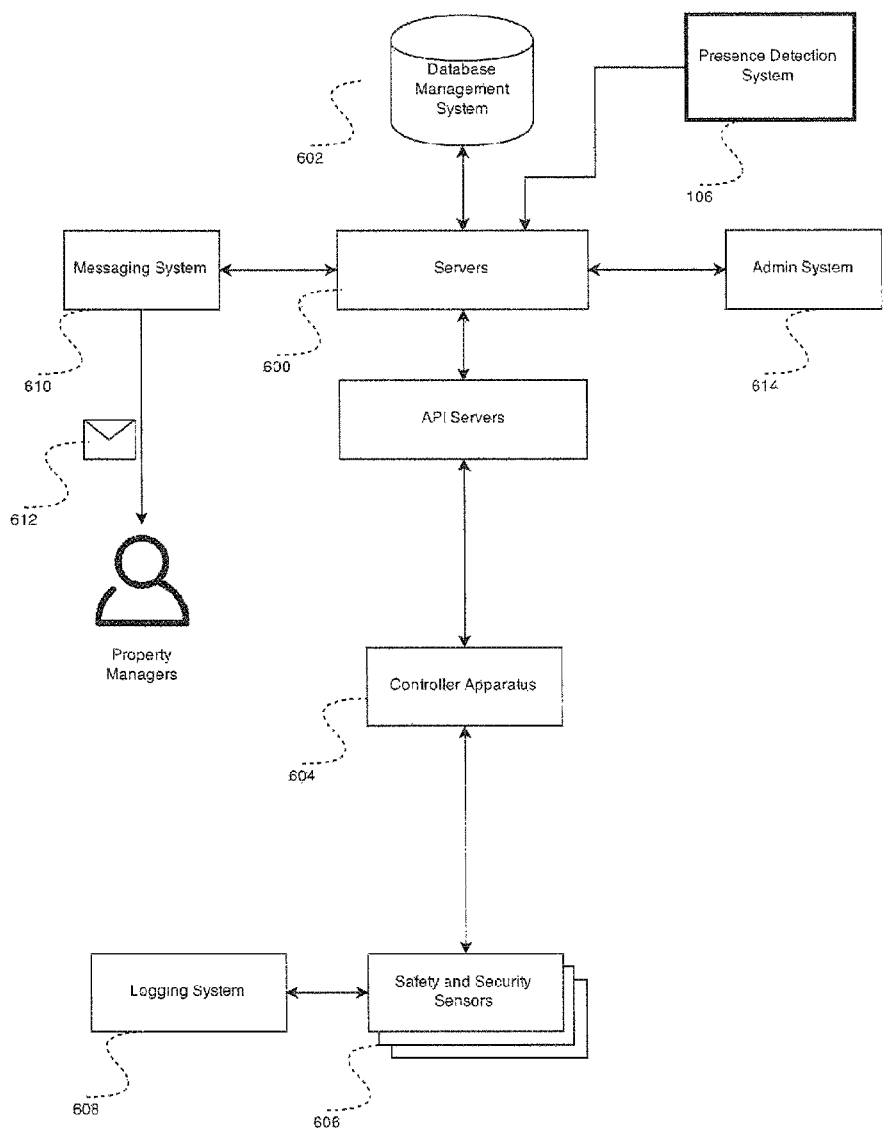
FIG. 6. shows a simplified block diagram of an embodiment of the safety and security system according to an aspect of the inventive subject matter.

In some embodiments the presence detection module is arranged in data communication with a safety and security module/system. FIG. 6 is a block diagram illustrating the safety and security system 110. In this embodiment, the servers 600 may receive input from the presence detection system 106. An array of safety and security sensors 606, for example water hazard sensors, flood sensors, window sensors, door sensors, may be positioned or installed at various locations at the accommodation. A controller apparatus 604 reads at regular intervals, the readings or state of the various safety and security sensors, and communicates these vector of readings from the sensors to the servers 600 via an API server for storage on the database management system 602. The servers 600 may use a data vector of safety and security sensor data collected to determine the status of safety and security in the accommodation and compute if the property manager needs to take any action. If the property manager may be informed of the status of the safety and security in the accommodation, or actions he may be required to take via message 612 sent through the messaging system 610. The messages 612, may be in the form of SMS, email, mobile push notifications or other modes of communication to an authorized personnel such as the property manager. A logging system 608 may store records of events in the safety and security system. An administrative system 614 allows a property manager to have an overview and read reports of the status of safety and security in the accommodation, and the required actions to take.

In some embodiments, methods of managing a premise may utilize the aforementioned embodiments in varying combinations and ways may be achieved. In an embodiment, a method for managing a premise may comprise the steps of: receiving from a user device a request for reservation to access a premise for a specific duration; verifying the request for reservation; wherein upon verification generating by a key generator a secret key; wherein the secret key permits the user to access the premise for the specific duration. In another embodiment, a method for managing a premise may comprise the steps of: receiving from a reservation module a request for reservation to access a premise for a specific duration; verifying the request for reservation; wherein upon verification; generating by a key generator a secret key; wherein the secret key permits the user to access the premise for the specific duration.

In some embodiments, the lock system 104 and the presence detection system/module 106 can be used either independently or in combination to determine the presence of guest at the premise. In one embodiment, only the entry and exit logs of the lock system 104 are used to determine the state of occupancy at the premise. Although the entry and exit logs of the lock system 104 can indicate whether someone have entered or left the premise, such information cannot specify the exact number of people who have entered nor the exact number of people who have left the premise. Thus, in some embodiments, the presence detection system 106 is used to identify the exact number of occupants at the premise via the detection of mobile phone(s) at the premise. The presence detection system 106 therefore can provide a more granular way to identify the number of occupants at the premise. Nevertheless, using only the presence detection system 106 that operates via the detection of mobile phone may suffer some drawbacks. For example, in the event that a mobile phone runs out of battery or shuts down, the presence detection system 106 will identify that the person (i.e., user of the mobile phone) is no longer at the premise, even when the person is in fact still at the premise. Thus, it is to be appreciated that the information or data obtained from the lock system 104 and the presence detection system 106 may be combined together in determining the presence of guest. For example, when the lock system 104 records an exit log, and at the same time, there is a corresponding drop in the number of mobile phones detected at the premise, these information together could provide an indication with higher probability that someone has left the premise and the premise is no longer occupied.

In some embodiments, the secret key 220 may be generated in real-time via the API (Application Programming Interface) servers, wherein the secret key provisioning server 206 acts through the API servers, the controller apparatus 208 and the lock system 212 to generate the secret key 220. In some alternative embodiments, the secret key provisioning server 206 is able to directly generate the secret key 220, wherein the method/algorithm to generate the secret key 220 is stored locally in the secret key provisioning server 206. The storage of the method to generate the secret key 220 in the secret key provisioning server 206 can be implemented during the setup of the reservation management and lock system.

In some embodiments, in addition to mobile terminal's fingerprint that may differ according to the mobile terminal's operating system, more details on a network scan that will uniquely identify a mobile device or terminal, for example, a hostname of the mobile terminal. A hostname is a label that is assigned to a device (e.g., mobile terminal) connected to a computer network and that is used to identify the device (e.g., mobile terminal) in various forms of electronic communication such as the World Wide Web. For example, all android devices can be uniquely identified by their hostnames when they are connected to a router.

In some other embodiments, techniques at the router level are utilized to uniquely identify a mobile terminal. For example, detecting the media access control address (MAC address) of the Wi-Fi chipset or Bluetooth chipset when these chipsets of the mobile terminals are turned on. These MAC addresses are unique, and therefore can uniquely identify the mobile terminal and its manufacturer.

In some embodiments, the probabilistic model implemented in the engine can be simplified as follow—the probability of the number of occupants at a premise may be a linear combination (e.g. weighted sum) of:

a. Exit logs from the lock system 104;
b. The number of mobile phones detected on the premise;
c. The base number on mobile phones detected on the premise prior to reservation of the premise;
d. The occupancy pattern over the period of the reservation; and
e. Learnings from user input(s) during the period of reservation.

In some embodiments, the learnings from user inputs are facilitated by a supervised learning algorithm, which might take the form of a logistic regression model. The logistic regression model records all actions/determinations made by the probabilistic model, and penalizes the probabilistic model whenever a wrong action/determination is made and rewards the probabilistic model whenever a correct action/determination is made. For example, a mistake in determination (e.g., the air conditioner is switched off when the guest is actually present) is detected when the air conditioner is switched off by the probabilistic model, and the user manually switches on the air conditioner again. Once such 'mistakes' are identified, the machine learns through penalization and avoid the same solution again.

A Stochastic Gradient Descend (SGD) technique may be utilized, such that the parameters of the supervised learning algorithm can be fine-tuned for users of the premises based on the data of wrong and correct actions/determinations. The accuracy of the probabilistic model can therefore be continuously enhanced.

The probabilistic model of the present invention will be increasingly advantageous with the popularity of an online accommodation reservation portal such as Airbnb™ and the rise of "sharing economy". Guest data is tracked as he/she stays at different locations around the world. Premises using the probabilistic model of the present invention can immediately cater to the specific needs and travel habits of a guest based on his/her data.

Furthermore, in some embodiments, the determination of the probabilistic model can be overridden by a guest or a premise manager manually. For example, in some embodiments, the premise manager might set the parameters of the probabilistic model to be more stringent during a particular period of time (e.g., 9 pm-9 am) so that the probabilistic model won't be easily triggered to disrupt the sleep of the guests.

To further elaborate how the presence detection system 300 may work, an example of a simplistic probabilistic model is described herein. A few examples of the vector data that might be used by the simplistic probabilistic model for detecting the presence of guests are listed below:
a. mobile phone geolocation 316;
b. ibeacon location information 312;
c. network inspection information including WiFi data, Bluetooth data, ip address information and host names 314; and
d. sensor information (like passive infrared sensor data) 306.

In some embodiments of the invention, if the host does not install 312 and 306, the user of the invention can rely on the mobile terminals of the guests 314 to calculate the probability of the presence of guests.

In some embodiments of the invention, the presence detection system 300 knows the default number of network devices at an unoccupied premise. When new mobile terminals are joined in the network (wherein the mobile terminal is deemed a proxy to a guest), the presence detection system 300 can report/record that "probably a guest is in the house". The result produced by the presence system 300 is a probability, not a certainty, because there may be cases of the mobile terminal charging at the premise and the guest has left the premise without carrying the mobile terminal.

In some embodiments, the sensor information 306 is included in the presence detection system 300, wherein the sensor checks whether there is infrared activity or not. With the sensor information 306, the presence detection system 300 has another information to determine the guest presence at the premises. In some embodiments, the presence detection system 300 can further improve the calculation of the probability of the guest presence by taking the current time of the day into consideration.

TABLE 1

Illustration of possible probabilities generated by the presence detection module 300 from 9a.m to 9p.m. (without accounting bias weight).

| Time | Bias weight for time | Has Phone in network | Positive Infrared Reading | Probability of someone in the house |
|---|---|---|---|---|
| Weight | 0 | 0.3 | 0.7 | |
| 9am-9pm | 0 | 1 | 1 | 1 |
| 9am-9pm | 0 | 1 | 0 | 0.3 |
| 9am-9pm | 0 | 0 | 1 | 0.7 |
| 9am-9pm | 0 | 0 | 0 | 0 |

TABLE 2

Illustration of possible probabilities generated by the presence detection module 300 from 9p.m to 9a.m. (with bias weight). A bias weight is introduced in the probabilistic model of Table 2 because the user/guest is expected to be at the premise during this period of time (9p.m to 9a.m).

| Time | Bias weight for time | Has Phone in network | Positive Infrared Reading (PIR) | Probability of someone in the house |
|---|---|---|---|---|
| Weight | 0.4 | 0.3 or 0.8 | 0.7 if positive, 0.2 if negative | |
| 9pm-9am | 0.4 | 0 | 0 | 0.4 |
| 9pm-9am | 0.4 | 1 | 1 | 1 |
| 9pm-9am | 0.4 | 1 | 0 | 0.88 |
| 9pm-9am | 0.4 | 0 | 1 | 0.82 |

In some embodiments of the invention, a weight is added to a positive reading of a data, or for compensation of a negative reading. In the above example, because guests usually sleep at night, the presence detection system 300 therefore has a bias for that period of time. Also, because passive infrared detectors are often not effective in detecting the presence of guests when they are asleep, sensor information 306 (passive infrared detectors) are only given a weight of 0.2 for a negative reading.

In embodiments using this simplistic model, the probability of the guest presence may be calculated using the formula as follows:

$$P = \text{Bias} + (1-\text{Bias})((\text{Weight } A * \text{Reading } A) + (\text{Weight } B * \text{Reading } B))$$

The examples summarized in Table 2 are calculated based on the exemplary formula above as follow:
When there are no readings of a mobile terminal being present and the PIR sensor: P=0.4+(0.6)((0*0.8)+(0*0.2))=0.4 (i.e., 40% chance of the presence of user at the premise);

When there are both readings of a mobile terminal being present and PIR sensor indicates presence: P=0.4+(0.6)(1*0.3+1*0.7)=1 (i.e., 100% chance of the presence of user at the premise);

When there is no PIR reading indicating presence, but there is a mobile terminal present: P=0.4+0.6(1*0.8+0*0.2)=0.88 (i.e., 88% chance of presence of user at the premise);

When there is a PIR reading indicating presence, but no mobile terminal present: P=0.4+0.6(0*0.3+1*0.7)=0.82 (i.e., 82% chance of presence of user at the premise).

In the probabilistic model elaborated above, the weight for the PIR reading shifts from 0.2 t 0.8 because it is highly dependable when there is a positive reading, but not so when there is a negative reading. This is because the PIR may not detect a user when the person is lying motionless and sleeping for example. Therefore, in order to compensate for false positives, the weight for the positive reading is correspondingly decreased.

Depending on the circumstances, the weights can be fine-tuned with real data. With more data, the weights can be further fine-tuned to improve the accuracy of the presence detection system 300.

In some embodiments, the information/data from the lock system 104 can be included in the probabilistic model of the presence detection system 300. For example, if the lock system can detect that the door is opened from the outside, this data/information can be given a weight and incorporated in calculating the probability of the guest presence. In this example, the information of the door opening from the outside is a good indication that the user may be returning back from outside, and therefore there is a high probability that the user is present at the premise. In some embodiments, the lock system 104 works alone in determining the presence of guest without corroborating its information/data with information/data from the presence detection system.

In some embodiments, the lock system 104 may generate information for a series of events: for example:
(1) lock being opened from inside.
(2) lock opened from outside
(3) lock opened using pin code from outside.

Based on the information/data for these events, the probabilistic model can calculate the probability of the presence of guest at the premise.

In some embodiments, the premise management system comprises a service module arranged in data communication with the presence detection module to receive the specific duration and a status of whether the user is within range of the premise, and thereafter to determine at least one goods or service to offer to the user. The service module may be in the form of an automated services ecosystem (not shown). This services ecosystem is an on-demand service that includes housekeeping, handyman, concierge, healthcare, transport services amongst others, that is fully automated to serve the guest in a personalized fashion.

The way the automated services ecosystem works is that the system is built to receive information on guest booking and reservation, such as check-in and check-out timing, as well as guest occupancy information, such as when the guest is in or out of the property, as well as information about their usage behaviour when in the property. With all these information, an automated concierge system can be deployed to serve the guest better to enhance the guest experience.

For example, once the guest arrives at the airport, if desired, a limousine service can be dispatched to pick the guest up from the airport. The identity of the guest can be verified 10 easily through the booking management platform, and the guest will be ferried to the property. Such airport transfer services is not restricted to limousine services, could be automation of rental of cars, motorcycles and other forms of transport, and could even include driverless vehicles.

Once the guest checks-in via an access system, the proposed detection system is able to help monitor and track guest behaviour over the stay. When something happens, such as when the air-conditioner is found to be leaking, or the carpet is stained, an alert to an automated housekeeping or handyman service will be activated to ensure the anomaly is rectified. Other services could include a home healthcare service that can be activated in the event of any health issues detected with the guest. On the other side, should the guest request for information on travel or food, an automated tour system can also be triggered to invite the guest on on-demand tour services to bring him or her around.

Once check-out by the user/guest is detected, the automated housekeeping and laundry service will be informed to prepare the house for the next check-in. The automated services ecosystem, through a series of sensors will check that the accommodation or premise is thoroughly cleaned and ready to welcome the next guest.

In some embodiments, the lock system 212 comprises of a technology that enables remote generation of number codes without the need for internet connection. There are many ways that such passcodes can be generated. For example, the generation of a passcode can be achieved via a cryptographic algorithm, either synchronously or asynchronously, or using the challenge-response token. The passcode generated might include information of the exact lock it can unlock, as well as the time, the date and the valid duration of the passcode. The key generator may be integrated with the lock system.

This technical feature enables the lock system 212 to operate without the need for Internet. Such a feature makes it easily deployed in a multitude of places as well as a wider spectrum of accommodations. For example, accommodations at vacation areas typically do not have strong internet connectivity, especially those in areas that are prone to adverse weather conditions that threaten internet connectivity. Other examples would include the basement of houses, or underground accommodations, or accommodations that are in the middle of oceans like boathouses or cruises. In addition, this also allows flexibility in deploying the present lock system 212, such as in accommodations where the entrance that the lock system is to be installed in is far away from the Internet hubs, like in castles, palaces or tree-houses. Traditional solutions that require internet connectivity would not work and the present invention accordingly offer a superior alternative.

In another embodiment, the lock system may be in the form of a lock box comprising a compartment for storing at least one pre-identified item; a controller arranged to receive the secret key from the key generator; a detection device comprising an identifier tag attached to the at least one item, the identifier tag arranged in data communication with the controller to determine a first status on whether the at least one pre-identified item is present or absent in the compartment and a second status on whether the at least one pre-identified item is associated with the compartment. The lock system 212 itself also can also come in different shapes. For example it can come in as a standard lock, such as latches, bolts, rims or mortices designed according to standards such as the European or American standards.

The compartment can take the shape of safe or lockboxes, such as those that realtors or real estate agents commonly used in countries such as the USA.

For the particular setup of the lock system having a compartment in the form of a lockbox, the lockbox opens to enable the accommodation manager to store pre-identified items such as physical objects used to access the property such as keys, key fobs, key cards and so on. To ensure that such access objects do not get stolen or misplaced, a detection system is put in place. For example, a typical solution would be to use the identifier tag in the form of RFID tag, or Bluetooth tag, or cellular technology amongst others. These systems have the ability to ensure that when the keys are misplaced, or misappropriated, that security alarms can be activated to inform the accommodation manager to take action. For example, this system can also detect anomalies such as if a wrong key has been placed back into the lockbox, or the key has been away from the lockbox for too long. All these information can be relayed to the cloud if the lockbox comes into connection to the internet, or the information can be relayed when a mobile phone is brought near to the lockbox where the logs can be transferred to the mobile phone into the cloud. Regardless, much like the blackbox in an airplane, logs are stored to ensure that retroactive investigation can be done.

The locking system that takes the form of the lockbox can come in various shapes. In some embodiments, the lockbox will be able to hooked or nailed to the wall for ease of implementation. In some embodiments, the lockbox has also been designed to hook around handlebars, knobs, latches and others, by having a flexible and adjustable hook. In some embodiments, the lockbox also comes with support hooks and hangers that enable it to be nailed or attach to walls or any protrusions easily. The idea behind here is for the lockbox to be easily deployed, and removed if need be. In some embodiments, another use for the lockbox would be for it to be used like a padlock, which would be the base case if the accommodation manager is not interested to use it to store keys.

The lock system can come with state of the art technology with any digital locks. In some embodiments, in order to enhance security, the lock system comes equipped with tamper alert, lock-out mode and other relevant features to prevent malicious attacks on the lock to force it open via physical or other means. Backup mechanisms are also put in place in the event of power or electronic failures. There is always a physical key, or a jump-start of the power of the lock in the front panel of the lock or the lockbox and other relevant features that would ensure that the lock system can be opened in the event of unexpected failure.

Other embodiments or variants may be apparent to a skilled person as follows: In some embodiments, the requests to make reservations may comprise: name of guest, start date and end dates of reservation, premise to book, reservation ID (optional), other guest details (optional).

In some embodiments, instead of using push channels to send electronic commands because it is advantageous to use a push channel to reduce time it takes to send the event or command to the controller apparatus, pull channels may be utilized to receive the electronic commands.

In some embodiments, the mode of data communication between the various modules/servers with other servers or apparatus/devices are secure to prevent sniffing by third parties in the network. One way by means of this secure communication is by HTTPS protocol.

In some embodiments, the system may comprise the reservation management module and presence detection system without the lock system. The other modules, i.e. energy conservation module, user preference engine, safety and security module/system etc may be arranged in data communication with the reservation management module to receive inputs from the same.

In some embodiments, the various systems or modules described may comprise a plurality of servers or IT systems that cooperate and communicate with a variety of accommodation reservations systems to facilitate the import of guest reservations; this communication can occur via application programming interfaces or by means of import. This system may comprise the storage of guest reservations by means of importing data within the calendar containing the guest reservations provided by any accommodation reservation system;

In some embodiments, the various database management systems which stores data, including, but not limited to, the guest reservations, and associated secret keys tied to the reservation.

In some embodiments, a lock system that is able to receive instructions to provision or remove the secret keys that a guest uses to open a barrier to access the premise. It is advantageous that this lock system is able to receive instructions to lock or unlock a barrier to access the premise, such as a door.

It is to be appreciated that the variety of accommodation reservation systems may, or may not be part of the system. It is however, in a preferred embodiment of the invention, that the system cooperates and communicates with a variety of accommodation reservation systems in the market. This is because guests can make reservations across a wide spectrum of these reservation systems, and hence it is an advantage to integrate with as many of the reservation systems as possible.

In some embodiments, the secret key may be presented to the lock system by means of the user mobile terminal or user mobile device, the mobile device which may, or may not be part of the system.

The guest may be sent messages from the messaging system at various stages before the guest checks in and after the guest checks out of the accommodation. In an embodiment of this aspect, the guest may be sent a message containing instructions on how to use the secret keys one week before he is due to check in, a message to inform the guest that the secret key is activated just before the check in time of the reservation, and another message to inform the guest that the secret key has been deactivated.

The lock system logging system may, or may not be part of the system. In the preferred embodiment of the invention, it is advantageous that the records of the lock system may be used in other parts of the invention, for example the presence detection system. These records may contain, but not limited to, records of when the lock system has been open, from which side of the door has been opened, and for how long the lock system has remained opened.

In another embodiment, the invention provides for a system and method for presence detection, which may comprise of: a plurality of servers or IT services; a database management system to store vector of readings from sensors; a controller apparatus to capture readings from the sensors, and to communicate the readings to the database management system; a plurality of devices or sensors to detect human presence installed at the accommodation; these sensors may be, but not limited to, motion sensors or passive infrared sensors; a network inspection device installed in the internet network of the accommodation; a router or plurality of routers, which can perform a reverse domain name server (DNS) lookup of private IP addresses to DHCP hostnames, installed in the internet network of the accommodation; a wireless device advertising its location on the wireless network. An exemplary embodiment of this component is a Bluetooth beacon advertising its location in the accommodation; a mobile terminal or plurality of mobile terminals, which acts as a proxy to the guest's physical location. The mobile terminal may disclose its location coordinates, which may be, but not limited to, GPS location, WiFi positioning or cell-tower locations with estimated accuracies, to the presence detection system; the mobile terminal may also scan for wireless devices advertising its location; a plurality of servers or IT systems to compute, based on the vector or readings, the probabilistic model whether there are any guests present in the accommodation.

In another embodiment of the invention, the presence detection system may use a vector of data, from sensors readings of human detection sensors installed on the accommodation, and components used to detect devices detected from scanning the network, and readings of proximity and location from the guest's mobile phone at regular intervals to form a probabilistic model of whether a guest is present at the accommodation. This model will be trained and refined from the historic data that the system has amassed via machine learning techniques. The plurality of human presence detection devices may, or may not be part of the presence detection system. It is advantageous to have these human presence sensors installed at the accommodation because if human presence, for example motion, is detected for a prolonged period, it is highly probable that a guest is within range or present. However, there will be situations where the guest is within range or present but the motion sensors will fail to pick up readings beyond the specified threshold, for example when the guest is asleep; in this case the presence detection system will rely on the other inputs from the other components to form the probabilistic model.

One of the common guest behaviours after they check-in to the accommodation is to connect to the internet network on their computers and mobile terminals. The mobile terminal is often a personal device which a guest brings out with him of the accommodation.

The network inspection device may, or may not be part of the presence detection system. However, it is an advantage to install these devices in the accommodation to detect the presence of the guest's mobile terminals. The network inspection device performs, at regular intervals, port scanning or deep packet inspection of the network packets in the internet network of the accommodation to scan for the presence of mobile terminals to detect a mobile phone's signature fingerprint. The mobile terminal's fingerprint will differ according to the mobile terminal's operating system. If a network fingerprint associated to a mobile terminal is detected, it increases the probability that a guest is at the accommodation. The number of devices connected to the internet network are also monitored and stored on the database system. If the number of devices detected are larger than the baseline number of devices detected when there are no guest reservations, a guest device or mobile terminal may be present at the accommodation, and this input is used to form part of the probabilistic model.

The network routers may, or may not be part of the presence detection system. It is advantageous to install these network routers that can perform a reverse domain name server (DNS) lookup of private IP addresses to DHCP hostnames. This is because certain mobile terminals will register DHCP hostnames which exude a signature so that the presence detection system is able to detect the presence of these mobile phones. An exemplary embodiment of this component is the detection of Android phones, which register a DHCP name starting with "android" with the router. By checking on the devices registered with the DHCP server at a regular interval, the presence detection system will be able to determine if there are mobile terminals present in the accommodation, and use that in the probabilistic model.

The mobile terminal may, or may not be part of the presence detection system. The guest may install a mobile application on the mobile terminal, the mobile application will be able to reveal the location of the mobile terminal, by means of, but not limited to Global Positioning System, WiFI positioning or cell tower position. The location of the mobile terminal will reveal whether it is in near proximity of the accommodation and hence act as a proxy to whether the guest is within range or present. The application may send the location of the terminal at regular intervals or when the location changes significantly to the plurality of servers for processing or the database management system for storage.

The wireless device advertising its location may or may not be part of the presence detection system. In an embodiment of this component, a Bluetooth beacon is placed within the accommodation advertising itself on the Bluetooth network. The application installed on the mobile terminal, acting as a proxy to the location of the guest, may scan to see if the mobile terminal is within the vicinity of the Bluetooth beacon, preferably in the background. If the mobile terminal is within close proximity of the Bluetooth beacon, it will communicate this information to the plurality of servers for processing or the database management system for storage.

In another embodiment of the present invention there are systems and methods for achieving energy conservation for the accommodation, which may comprise of: a plurality of servers or IT systems that will compute and determine whether it should conserve energy. It may perform such determination based on input from the presence detection system or preset rules.

A controller apparatus that receives instructions and communicates with a plurality of servers or IT systems, and communicates instructions to switch on or switch off to an array of power controllers. The communication to the power controller system may occur via Bluetooth, radio frequency channels like, z-wave or ZigBee protocols, or other suitable means of communication; an array of power controllers installed at the accommodation. The power controllers may be, but not limited to, thermostat controllers, light intensity controllers, or air conditioner controllers; a push channel where a plurality of servers or IT services can send events and commands to the controller apparatus by suitable means, for example by client long polling, Websocket, server-side events, socket servers or other server push technologies. It is advantageous to use a push channel to reduce time it takes to send the event or command to the controller apparatus; a messaging system comprising of a plurality of servers or IT systems to inform the property manager that the energy conservation has taken effect; a logging system comprising of plurality of servers or IT systems. The logging system may stores events of energy conservation, for reporting or to inform the property manager; an administrative system which allows a property manager to override the settings by the energy conservation system turn on or turn off a selective power controller or all the power controllers in the accommodation, by means of web, mobile, PC or any other suitable interface.

The messaging system and the logging system may, or may not be part of the system.

In an embodiment of the invention, the energy conservation system may determine to conserve energy if no guests has been detected at the premises for 20 minutes, but may the air-conditioning on at night due to preset rules. After the system determines that the energy conservation mode needs to be triggered, instructions are sent to switch off an array of power controllers via the controller apparatus. For example, if the accommodation has an air-conditioning system, the controller apparatus may send commands to the air-conditioning controller to switch off the air-conditioning. Likewise if there are lights controlled by light controllers within the accommodation, the controller apparatus may send commands to the light controllers to switch the lights off.

In another embodiment the invention provides for a system and methods for guest control and personalise environmental and ambience settings, which may comprise of: a control device, or plurality of control devices, used by guests to control environment or ambience variables of the accommodation. This may be, but not limited to, an electronic device or a mobile terminal which may have an installed application. The control device collects the data regarding the guest's preferences and sends this to the processing servers or database management system; a plurality of servers or IT systems that receives instructions and data from the environment control device; a database management system that stores the data from the control device and the environment or ambience preferences of the guest; a plurality of servers and IT systems that uses the vector of guest preference data collected, and vector of readings from the environmental and ambience sensors in the database management system to compute the environment or ambience preferences of the user; an array of environmental sensors or ambience sensors installed at the accommodation. These sensors may be, but not limited to, temperature sensors, light intensity sensors, humidity sensors or sound level sensors, an array of environmental controllers or ambience controllers installed at the accommodation. These controllers may be, but not limited to, thermostat controllers, light intensity controllers, air conditioner controllers, humidity controllers or controllers to sound systems.

In some embodiments, a controller apparatus that receives instructions and communicates with a plurality of servers or IT systems, and communicates these instructions to change the environment variables using the environmental controller or ambience controller is provided. The communication to the environmental controllers or ambience controllers may occur via Bluetooth, radio frequency channels like, z-wave or ZigBee protocols, or other suitable means of communication;

In some embodiments, the guest installs a mobile application on a mobile terminal to control environmental or ambience variables at the accommodation, for example temperature, humidity and brightness in the accommodation. The environmental or ambience variables that are controlled may be for the entire accommodation or just for a room in the accommodation. When a guest uses the mobile application to control the environmental or ambience variables, these data is sent to a plurality of servers for processing or to a database management system for storage.

In some embodiments, the mobile application is tied to the guest's identity. This may be by means of the guest logging in using his email or by any suitable user identity resolution approach, for example Google+ or Facebook logins, or an approach that may be tied to the signature, fingerprint or identifier that identifies that mobile terminal's uniquely.

In some embodiments there is provided a plurality of servers that use the multi-dimensional vector of guest preference data collected, or vector of sensor readings from the environmental and ambience sensors to perform statistical analysis and computation of the guest's environmental or ambience preferences. A guest environmental preferences may be broken down by time, by day, by season or by geographical region.

In some embodiments, the personalisation system may use data from the presence detection system to do a probabilistic determination if there are more than one guests are present at the accommodation for a particular reservation; the guest's preferences may be then combined in a hybrid blending model to get the accommodation's desired settings for the environment or ambience variables, to ensure the utmost comfort level for the guests.

After the desired environment controllers or ambience settings for the accommodation has been computed for a particular reservation, the personalisation system may pre-configure the default or recommended settings of the control device for a guest for a particular reservation as a personalised setting. The personalised setting is learnt from the previous interactions of the guest with the system. Via these interactions, a preference model can be built for each guest, which may be represented as a multi-dimensional vector model that defines the guest's preference for climate and living habits. For new guests, due to the large amount of data amassed before, the system will be able to rapidly learn this preference model from the guest's initial interactions, by looking for preferences of similar users who have similar behaviours, via any technique in collaborative modelling or similar modelling techniques.

With the personalised setting, the guest will be able to easily change to his desired environment or ambience. The personalisation system may communicate instructions to the controller apparatus via a push channel, which in turn send commands to environment controllers or ambience controllers to change to the desired settings. The desired settings may be computed at regular intervals during the guest's stay for that reservation, taking into account the new data after the guests have checked in for that reservation.

In another embodiment of the invention there is provided a system and methods for monitoring safety and security hazards at various locations of an accommodation, which may comprise: a plurality of devices or sensors that covers the safety and security aspects of the accommodation; these sensors may be, but not limited to, smoke hazards sensors, water hazard sensors, flood sensors, window open/close sensors, door open/close sensors; a plurality of servers and IT systems that uses the vector of safety and security sensor data collected in the database management system to inform the property manager and required actions if any; a database management system to store vector of safety and security readings from sensors; a controller apparatus to capture readings from the sensors, and to communicate the readings to the database management system; a logging system comprising of plurality of servers or IT systems. The logging system may stores events, for reporting or to inform the property manager; a messaging system comprising of a plurality of servers or IT systems to provide warnings or advice actions to take to the property manager; an administrative system which allows a property manager to have an overview of the status of safety and security in the accommodation, and the required actions to take if any, by means of web, mobile, PC or any other suitable interface. The logging system, or messaging system may, or may not be part of the safety and security system.

In an embodiment, the safety and security system may use an array of safety and security sensors at the property of the accommodation. Each sensor can be associated with a physical location of the property and represent an aspect of safety or security, for example including smoke hazard, water/flood hazard, door opened, window opened or others. These vector of security and safety sensor readings are communicated to the servers and stored on the database management system. When the sensor reading of a particular safety or security sensor exceeds a specified threshold, the system will be able to pinpoint the exact issue with any part of the property, and offer an early warning system to the property manager.

The safety and security system may use data from the presence detection system to do a probabilistic determination if any action is required. For example, if any guest is present in the accommodation and the window sensor detects that the window is open, no action may be required.

In another embodiment of the present invention, the accommodation management system comprises of administrative system, which allows the property manager to have an overview of the reservation management system, lock system, presence detection system, energy conservation system, safety and security system, by means of web, PC, mobile application or any other suitable interface. The administrative system may show graphs or diagrams of energy usage, presence or safety or security parameters of the accommodation, or of the reservation. The administrative system may also allow the property manager to perform administrative functions for example, lock or unlock the door to the accommodation, add PIN codes to the lock system, turn off a particular power controller or all power controllers for the accommodation, set default preferences for the environmental and ambience controllers for an accommodation, or set safety or security alarm thresholds.

In another embodiment of the present invention, there is provided a method of accommodation by means of managing guest reservations, provisioning secret keys for a lock system, detecting guest presence, conserving energy, personalizing guest experience of environmental and ambience, and the monitoring of safety and security hazards.

Various systems and methods of the accommodation management system with a lock system, presence detection, energy conservation, guest control and personalization, and monitoring safety and security have been described. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context.

It should be appreciated by the person skilled in the art that variations and combinations of features described above, not being alternatives or substitutes, may be combined to form yet further embodiments falling within the intended scope of the invention.

What is claimed is:

1. A system for premise management comprising
   a reservation management module having at least one server, the at least one server arranged in data communication with a user device of a user to receive a request for reservation from the user device to access a premise for a specific duration;
   a key generator arranged in data communication with the reservation management module and a lock system, wherein upon receipt of the request for reservation, the key generator generates a secret key for receipt by the lock system and for the user to access the premise for the specific duration;
   a presence detection module configured to be in data communication with the reservation management module, the lock system and a plurality of sensors to detect whether the user is within range of the premise; and
   a user preference engine configured to collect a plurality of user preference settings from a plurality of environmental sensors associated with an ambient or environmental variable of the premise, wherein the user preference engine is arranged in data communication with the presence detection module;
   wherein the presence detection module includes a probabilistic engine configured to allocate weights associated with each of the plurality of sensors to determine the probability of whether the user is present in the premise.

2. The system according to claim 1, wherein the secret key is in the form of at least one of the following: personal identification number (PIN) code, biometric signature.

3. The system according to claim 1, wherein the presence detection module is arranged in data communication with a plurality of sensors to detect whether the user is within range of the premise, wherein the plurality of sensors include at least two of the following: a motion sensor positioned within the premise; a network inspector to detect network access or usage by the user; a location sensor operable to detect and interact with the user device to determine the location of the user.

4. The system according to claim 1, wherein the presence detection module is arranged in data communication with an energy conservation module, wherein the energy conservation module is arranged in data communication with at least one power controller, comprising one of the following: a thermostat controller, a light intensity controller, and an air conditioner controller, wherein the at least one power controller is installed at a location within the premise, wherein each of the energy controller is associated with at least one apparatus.

5. The system according to claim 4, wherein the energy conservation module is configured to reduce the energy consumption or switch off the at least one apparatus associated with the plurality of energy controller when a user is determined to be absent from the premise in the day or night.

6. The system according to claim 1, wherein the presence detection module is arranged in data communication with a safety and security module.

7. The system according to claim 6, wherein the safety and security module is arranged to receive input from a plurality of safety and security sensors, the plurality of safety and security sensors positioned at various locations of the premise.

8. The system according to claim 7, wherein the plurality of safety and security sensors include a water hazard sensor and an access sensor.

9. The system according to claim 1, wherein the user device is a mobile device equipped with at least one wireless communication means.

10. A method for managing a premise comprising the steps of:
    receiving by a reservation management module a request for reservation from a user device of a user to access a premise for a specific duration;

verifying the request for reservation; wherein upon verification; generating by a key generator a secret key, wherein the secret key permits the user to access the premise for the specific duration;
- detecting by a presence detection module whether the user is within range of the premise, wherein the presence detection module is configured to be in data communication with the reservation management module, a lock system and a plurality of sensors to detect whether the user is within range of the premise;
- collecting by a user preference engine a plurality of user preference settings from a plurality of environmental sensors associated with an ambient or environmental variable of the premise, wherein the user preference engine is
arranged in data communication with the presence detection module;
- determining a probability of whether the user is present in the premise based on a probabilistic engine in data communication with the presence detection module configured to allocate weights associated with each of the plurality of sensors.

11. The method according to claim 10, wherein the plurality of environmental sensors includes a temperature sensor, a light intensity sensor, a humidity sensor, a sound level sensor or any two of the same.

12. The method according to claim 10 wherein the presence detection module is arranged in data communication with an energy conservation module and a safety and security module.

13. The method according to claim 10, further including the step of sending the secret key in the form of at least one of the following, personal identification number (PIN) code, biometric signature, barcode, or QR code to a lock system based on a wireless communication protocol, comprising of at least one lock controller device, wherein the lock system is arranged to receive an electronic command to enable the usage of the secret key from a first predetermined time before the specific duration and wherein the lock system is arranged to receive an electronic command to disable the usage of the secret key at a second predetermined time after the specific duration.

14. The method according to claim 12, wherein the plurality of sensors includes at least two of the following, a motion sensor positioned within the premise, a network inspector to detect network access or usage by the user and a location sensor includes a Bluetooth beacon operable to detect and interact with the user device to determine the location of the user.

15. The method according to claim 10, wherein the presence detection module is arranged in data communication with an energy conservation module, wherein the energy conservation module is configured to send a command to the plurality of energy controllers arranged in data communication with the energy conservation module, wherein the plurality of energy controllers include at least two of the following, a thermostat controller, a light intensity controller, and an air conditioner controller, to reduce energy consumption and to maintain energy consumption, installed at a plurality of locations within the premise.

16. The method according to claim 10, wherein the presence detection module is arranged in data communication with a safety and security module, wherein the safety and security module is arranged to receive input from a plurality of safety and security sensors including a water hazard sensor and an access sensor, the plurality of safety and security sensors positioned at various locations of the premise.

17. The method according to claim 10, further comprises a notification center operable to send notifications related to the reservation to the user device is a mobile device or at least one premise manager.

* * * * *